(12) United States Patent
Muhonen et al.

(10) Patent No.: US 7,843,921 B2
(45) Date of Patent: Nov. 30, 2010

(54) METHOD AND DEVICE FOR ROUTING DATA PACKETS IN A COMMUNICATION NETWORKS

(75) Inventors: Ahti Muhonen, Hirvihaara (FI); Martin Bergenwall, Espoo (FI); Jens Staack, Helsinki (FI)

(73) Assignee: Nokia Corporation, Espoo (FI)

( * ) Notice: Subject to any disclaimer, the term of this patent is extended or adjusted under 35 U.S.C. 154(b) by 2054 days.

(21) Appl. No.: 10/312,624

(22) PCT Filed: Apr. 30, 2001

(86) PCT No.: PCT/FI01/00413

§ 371 (c)(1),
(2), (4) Date: Apr. 4, 2003

(87) PCT Pub. No.: WO02/01817

PCT Pub. Date: Jan. 3, 2002

(65) Prior Publication Data

US 2003/0174691 A1 Sep. 18, 2003

(30) Foreign Application Priority Data

Jun. 29, 2000 (FI) .................................. 20001553

(51) Int. Cl.
*H04L 12/28* (2006.01)
(52) U.S. Cl. .................. 370/392; 370/389; 370/395.21
(58) Field of Classification Search ................. 370/351, 370/352, 355, 395.21, 389, 392
See application file for complete search history.

(56) References Cited

U.S. PATENT DOCUMENTS 5,995,503 A 11/1999 Crawley et al.
6,081,524 A * 6/2000 Chase et al. ................. 370/389
6,275,470 B1 * 8/2001 Ricciulli ...................... 370/238
6,545,781 B1 * 4/2003 Chang et al. .................. 398/51
6,560,233 B1 * 5/2003 Hatanaka et al. ............. 370/401
6,574,213 B1 * 6/2003 Anandakumar et al. ..... 370/349
6,778,502 B2 * 8/2004 Ricciulli ...................... 370/238
2002/0057699 A1 * 5/2002 Roberts .................. 370/395.32

FOREIGN PATENT DOCUMENTS

| EP | 0 637 153 A1 | 2/1995 |
| EP | 0 903 895 A3 | 5/1999 |
| EP | 1 035 751 A2 | 9/2000 |

(Continued)

OTHER PUBLICATIONS

C. Hedrick, Routing Information Protocol, Jun. 1988, www.ietf.org/rfc/rfc1058.txt.*

(Continued)

*Primary Examiner*—Ayaz R Sheikh
*Assistant Examiner*—Mounir Moutaouakil
(74) *Attorney, Agent, or Firm*—Harrington & Smith

(57) ABSTRACT

A method and a device for optimizing the routing of data packets, in which method data packets are received, data flow is detected on the received data packets, a feedback request is transmitted in response to the detected data flow, feedback information is received, feedback information is generated and added to the received feedback information, feedback information is transmitted and the data packets belonging to the data flow are directed on the basis of said feedback information.

35 Claims, 6 Drawing Sheets

FOREIGN PATENT DOCUMENTS

| | | |
|---|---|---|
| SE | 510 170 C | 4/1999 |
| WO | WO 98/52328 | 11/1998 |
| WO | WO00/14932 | 3/2000 |

OTHER PUBLICATIONS

Garcia-Luna-Aceves, Reliable broadcast of routing information using diffusing computations, Dec. 6-9, 1992, Global Telecommunications Conference, 1992. Conference Record., Globecom '92. Communication for Global Users., IEEE, vol. 1, pp. 615-621.*

Braden et al, Resource Reservation Protocol, Sep. 1997, www.ietf.org/rfc/rfc2205.txt, 146 pages.*

Chai-Keong Toh, "Associativity-Based Routing for Ad-Hoc Mobile Networks", Wireless Personal Communications, vol. 4, 1997, pp. 103-139.

* cited by examiner

METHOD AND DEVICE FOR ROUTING DATA PACKETS IN A COMMUNICATION NETWORKS

TECHNICAL FIELD

The present invention relates to a method and a device for routing data packets in communication networks.

BACKGROUND OF THE INVENTION

The Internet Protocol (IP) has enabled connectionless datagram service in a worldwide information network, the Internet. By means of said protocol the network is able to route messages to a correct destination address. Routing is performed on the basis of an IP network address and routing tables. The IP protocol is connectionless and does not provide reliable transfer which is assigned to other transmission protocols, such as Transmission Control Protocol (TCP). Each terminal connected to the World Wide Web has a specific IP address. Traffic of IP data packets in the telecommunication networks based on the Internet Protocol continues to grow. As a result of the growth, the communication networks continue to expand and the size of the network may become too large. The expanding network causes problems that appear as reducing data transmission rate and unreliable delivery of transmitted data. Typically, the growth has been restricted by dividing an excessively large network into smaller sections, i.e. subnetworks, and reconnecting said subnetworks to one another. To achieve this, a bridge is used between the networks, and simultaneously said bridge serves as a router for data flow. There is a slight difference, however, between a bridge and a router. The bridge is a data link layer operation and interconnects two networks of the same type by using physical addresses. The routing is a network layer operation which interconnects two or more networks of different types by using IP addresses. In addition to convey traffic between local area networks, the task of the router is also, in general, to serve as a gateway means between a local and an external router network.

Data flow consists of data packet sequences that are treated in an equal manner by routers between the source and destination addresses. A practical example of data flow transmission is, for instance, transmission of a data file over the network between two different computers. Data transmission is implemented by the Transmission Control Protocol (TCP), which divides the file into IP packets and sends them one at a time to the network. The packets pass via a plurality of routers and each router performs routing operations on each packet separately. The routers forward the packets to a next router without ever knowing whether the packet concerned reached its destination or not.

Currently, more and more information is transmitted on the Internet, particularly in the form of Internet calls and video data. In the near future, there will be a need for routers that are capable of transmitting a continuously increasing amount of information from a source address to a destination address as quickly and reliably as possible. One suggested solution to the problem is, for instance, to deconcentrate the router decision making between several processors. However, this will not solve the problem that each IP packet has to be routed individually. Another solution is to use IP switching which comprises a router and an ATM switch. An IP switch is able to route data packets in the same manner as ordinary routers but it differs therefrom in that it is able to perform data flow identification and switch the packets belonging to a given flow to pass via an ATM connection. The IP switch always requires other IP switches for being able to switch ATM connections, and in addition, the network must comprise a considerable number of IP switches in order for them to be actually useful. The identification and control of the flow are performed on the basis of the IP address of the sender or the receiver, for instance, whereby all packets belonging to the identified flow are directed via a given route to the address of the receiver.

In router networks the routers form nodes through which data packet transmission takes place. The data packets are conveyed through a router in two different ways. If a router receives a packet addressed to a next router, i.e. to a second router having a direct connection to said router, it allows the packet through without interfering with the routing thereof in any way. If a router receives a packet addressed to a receiver that has no direct connection to said router, the router has to solve the routing problem so as to define to which router the packet should be sent next in order for the packet to be sent to a correct address. The routers transmit datagrams towards a destination by using routing tables which are maintained by means of specific routing protocols. The routers exchange data on possible routes by means of the routing protocol and at the same time the routers are informed of the routing topology of the network. The topology information is collected in a routing table which contains information on possible destination addresses and how to reach them. The contents of the table depend on the routing algorithm used. In general, the routes are predetermined, and consequently each router knows in advance the next default router whereto the received packet will be transmitted. The predetermined routing leads all traffic, large and small packets alike, to pass along the same route in the network. This results in that certain routes are congested, whereas other routes have less traffic than their capacity allows.

FIG. 1 shows, by way of example, a typical network structure which comprises a sender 1, routers 2 to 6 and a receiver 7. Between the starting point and the destination there are generally a plurality of routers as appears in FIG. 1, and consequently data packets have a plurality of alternative routes from the sender 1 to the receiver 7. The router 2 can route the packet addressed to the destination 7 either via the router 3 or the router 5. The data packet routing selection is carried out in the router 2 on the basis of a routing table and a routing algorithm. For data transmission, the routing algorithm finds a route in the routing table, via which route it is possible to proceed in the network from the source address to the destination address. The routers form a default route between the sender 1 and the receiver 7, which consists of default routes between each router. Let us assume that said default route passes from the sender 1 via the router 2 to the router 5, and further, via the routers 6 and 4 to the receiver 7. If the formed default route does not work any longer at any one router because of increased traffic or some such reason, said router may make a change in the route and forward the data packets to another router. This change made on a local level by an individual router may affect other routers such that the traffic increases excessively for some routers while others operate at a lower than maximum capacity. This results in that the network is not routed optimally as a whole but each router tends to change its own routing to a more optimal direction seen from its own viewpoint. Thus, the network routing is not optimized on a more global level, which results in uneven loading in different sections of the network as the data traffic passes only on certain routes.

SUMMARY OF THE INVENTION

A method and a device for optimizing the routing of data packets in communication networks have now been invented.

The object of the invention is to provide a dynamic feedback mechanism between routers to optimize routing of a given data flow through a network from a sender to a receiver. Feedback can be given such that each next router provides feedback information by replying to a request of a preceding router. As a result, the feedback produces information on the routes that fulfill the requirements set for routing.

In the method of the invention, each router can start sending a revertive feedback request independently of other routers. The first router having a direct connection to a data flow sender detects a data flow for a particular destination and starts sending a revertive feedback request to all the routers that may form a route to said destination. All the routers that receive the feedback request message forward it to subsequent routers. Upon receiving the feedback request the last router having a direct connection to said destination generates feedback information and sends it back via the same route(s) as the request was received. The feedback may contain, for instance, information on how reliably or at what rate each router has conveyed packets. The feedback information thus passes along the same route(s) to the preceding routers which, in turn, add corresponding data of their own to the feedback concerned. The first router now receives feedback information on all possible routes that lead to said destination. The first router can now make its own decision on route selection on the basis of data about the reliability and speed of different routes and the applicability of the flow concerned to each route. The first router can also make feedback-based amendments in its routing table as regards the data flow concerned, which amendments allow the router to send all the packets belonging to the same flow via the same, optimized route in the future. By this, optimized routing is achieved for all the routes in the network, whereby large packets can be directed to other routes than small ones, for instance, and packets belonging to an IP call, for instance, can be directed to quicker routes than packets that do not require high transmission rate.

A first aspect according to the invention implements a method for routing data packets in a communication network comprising routers, in which method data packets from a source address are received in a first router, the data packets are routed from the first router to at least one next router, characterized in that a destination address is identified on the data packets in the first router, a feedback request is transmitted to said at least one next router in the direction of the destination address in order to find out the quality of connection between at least said first and said at least one next router, in response to the request information about the quality of at least said connection is transmitted from said at least one next router to said first router, routing decision is made in said first router on the basis of said received quality of connection data.

A second aspect according to the invention implements a system for routing data packets in a communication network, the system comprising at least a first router for receiving data packets from a source address and for routing further to at least one second router, said at least one second router being arranged to receive data packets and transmit them to a destination address, the first and at least one second router comprising routing means for routing the data packets, characterized in that the first router also comprises at least detecting means for detecting header data on the received packets, feedback request generating means for generating a quality of connection feedback request, feedback request transmitting means for transmitting the feedback request to said at least one second router in order to find out the quality of connection between at least said first router that sent the request and said at least one second router, and that said at least one second router also comprises at least feedback request receiving means for receiving the feedback request from said first router, feedback information generating means for generating feedback information in response to the received feedback request, feedback information transmitting means for transmitting the feedback information to said first router, and that said first router further comprises feedback information receiving means for receiving the feedback information from said at least one second router, and means for making routing decision on the basis of the received feedback information.

A third aspect according to the invention implements a routing device for routing data packets in a communication network, the routing device comprising receiving means for receiving the data packets, transmitting means for transmitting the data packets, routing means for routing the data packets, characterized in that the routing device also comprises at least detecting means for detecting header data on the received data packets, feedback request generating means for generating a feedback request for the quality of connection, feedback request transmitting means for transmitting the feedback request to at least one next routing device in the direction of the destination address, feedback request receiving means for receiving the feedback request from at least one preceding routing device in the direction of the source address, feedback information generating means for generating the feedback information in response to the received feedback request, feedback information transmitting means for transmitting the feedback information to at least one preceding routing device in the direction of the source address, feedback information receiving means for receiving the feedback information from at least one preceding routing device in the direction of the destination address, feedback information adding means for adding the generated feedback information to the received feedback information, means for making a routing decision on the basis of the received feedback information.

A fourth aspect according to the invention implements a computer program product for routing data packets in a communication network, the computer program product comprising computer program means for receiving the data packets at the router, computer program means for routing the data packets onwards from the router, characterized in that said computer program product also comprises computer program means for detecting header data on the received data packets, computer program means for transmitting a feedback request to at least one next router in the direction of the destination address, computer program means for receiving the feedback request from at least one preceding router in the direction of the source address, computer program means for generating the feedback request for at least one connection quality parameter, computer program means for receiving the feedback information from at least one preceding router in the direction of the destination address, computer program means for generating the feedback information on the basis of the received feedback request, computer program means for adding the generated feedback to the received feedback information, computer program means for transmitting the feedback information to at least one preceding router in the direction of the source address, computer program means for making a routing decision on the basis of the received feedback information.

In the invention, the routers detect the data flow, generate and transmit the feedback request in response to the detected data flow, receive the feedback request, generate and transmit the feedback information and add the generated feedback information of their own to the received feedback information. On the basis of the feedback information each router is able to optimize routing independently for their own part. Routing optimization is not performed packet-specifically but based on a particular data flow, and packets belonging thereto can always be transmitted via the same, once optimized route.

BRIEF DESCRIPTION OF THE DRAWINGS

In the following, the invention will be described in greater detail, with reference to the attached drawings, in which.

DETAILED DESCRIPTION

Figure 1:
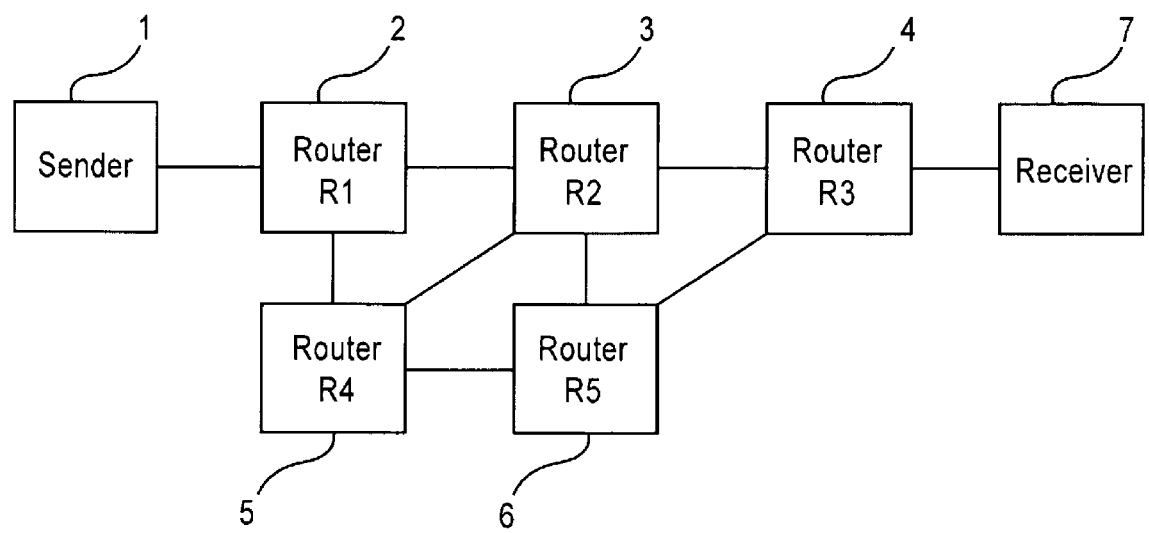
FIG. 1 illustrates a typical description of a network.

Prior art was described above with reference to FIG. 1. In the following the invention will be mainly described with reference to FIGS. 2 to 4.

Figure 2:
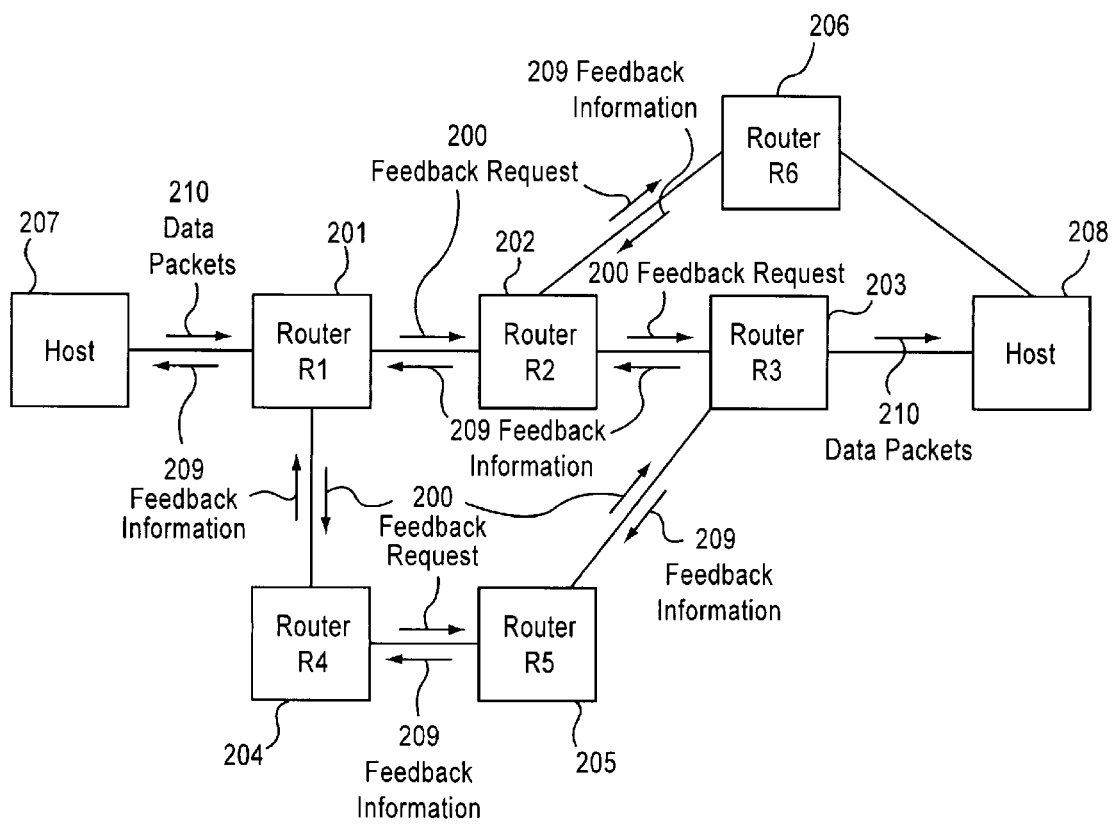
FIG. 2 illustrates a general block diagram of one operational environment according to the invention.

FIG. 2 illustrates a general block diagram of one operational environment of the invention. The router 201 is the first router of a host 207 which detects and routes data packets 210 sent by the host 207, identifies the data packets as a data flow, generates and transmits a feedback request 200 and receives feedback information 209 and makes a routing decision on the basis of the feedback information. The router 201 is also the host's 207 last router which conveys the data packets addressed to said host. The routers 202, 204 and 205 serve as intermediate routers receiving and transmitting feedback requests, receiving feedback information, generating feedback information of their own and adding it to the received feedback information to be forwarded and transmitting the feedback information back via the same route as the feedback request arrived. The routers 203 and 206 are the last routers of the host 208 which reply to arriving feedback requests by generating feedback information of their own and by transmitting it via the same route the feedback request arrived to them. The routers 203 and 206 can also be treated as the host's 208 first routers when the host 208 transmits data packets.

The first router 201 receives data packets 210 from the host 207 and identifies the packets as a data flow destined for the host 208. In addition to detection of source and destination addresses the characteristics of the data flow are detected at the same time. The detection of the data flow characteristics allows to distinguish between data flows of different media types with the same source and destination addresses. For instance, data flows of an IP call and an image file can be directed via different routes, so that the data flow of the IP call is directed via a quicker route and the data flow of the image file via a slower route. The router 201 transmits a feedback request 200 to next routers, i.e. to the router 202 and the router 204. The feedback request 200 may comprise e.g. the following data: ID, Q, Hip, R201ip. ID is the feedback request's individual identification number which acts as an identifier of said feedback request. In this example, Q comprises parameters representing the quality of service (QoS), such as the reliability or speed of the connection, but it may also comprise other parameters. Hip is the IP address of the data flow sender and R201ip is the IP address of the router 201. To the feedback request 200 is always added the IP address of each router in order for the transmitted request to return via the same route to the sender of the request. The routers 202 and 204 forward the feedback request 200 to the routers 203 and 206 adding their own IP addresses to the feedback request. In this example, the routers 203 and 206 are the last routers having a direct connection to the addressee. They also add their own IP addresses and generate feedback information 209 according to the request. For the router 203, the feedback information 209 could include the following: ID, Q, Hip, R201ip, R202ip, FB_R203, where FB_R203 is the feedback information of the router 203 on the requested parameter Q. It is possible to include in the same feedback request one or more parameters, as in the case of the example, speed and reliability of said router at that instant. Corresponding data are also included in the feedback information for other routers. The feedback information 209 of the router 202 to the router 201 would include ID, Q, Hip, R201ip, FB_R202, FB_R203 comprising, in addition to the feedback of the router 203, the feedback FB_R202 of the router 202 itself. The feedback information transmitted by the last routers 203 and 206 come to the router 201 via the same route as the feedback request arrived to them. The router 201 receives the feedback information on each possible route that leads to the host 208. On the basis of the received feedback information the router 201 optimizes for the data flow in question a route between the sender 207 and the receiver 208.

If the routing results from the router 202 to the router 201 fulfill the set criteria, said path between the routers 201 and 202 fulfill the conditions set for forming a route. A corresponding inspection is also performed between other routers. For instance, if the routing results returned from the router 202 to the router 201 of the path between the routers 202 and 206 do not fulfill the route forming conditions, the router 201 has to find a better route via another route, which in this case is the router 203. The router 201 may also, if possible, inform the application program about inadequate results for route forming, for instance, too low a service level.

Route optimization for a given data flow can also be performed more often than only in connection with the flow identification. The optimized route can be updated at given time periods, for instance. The routers can transmit the feedback request independently, which is useful particularly in a network where loading between different sections often varies. Any one router locating on the route can generate a feedback request and transmit it to next routers, if the local operation of the network changes for some reason, for instance, due to disturbance or a sudden change in loading.

Figure 3:
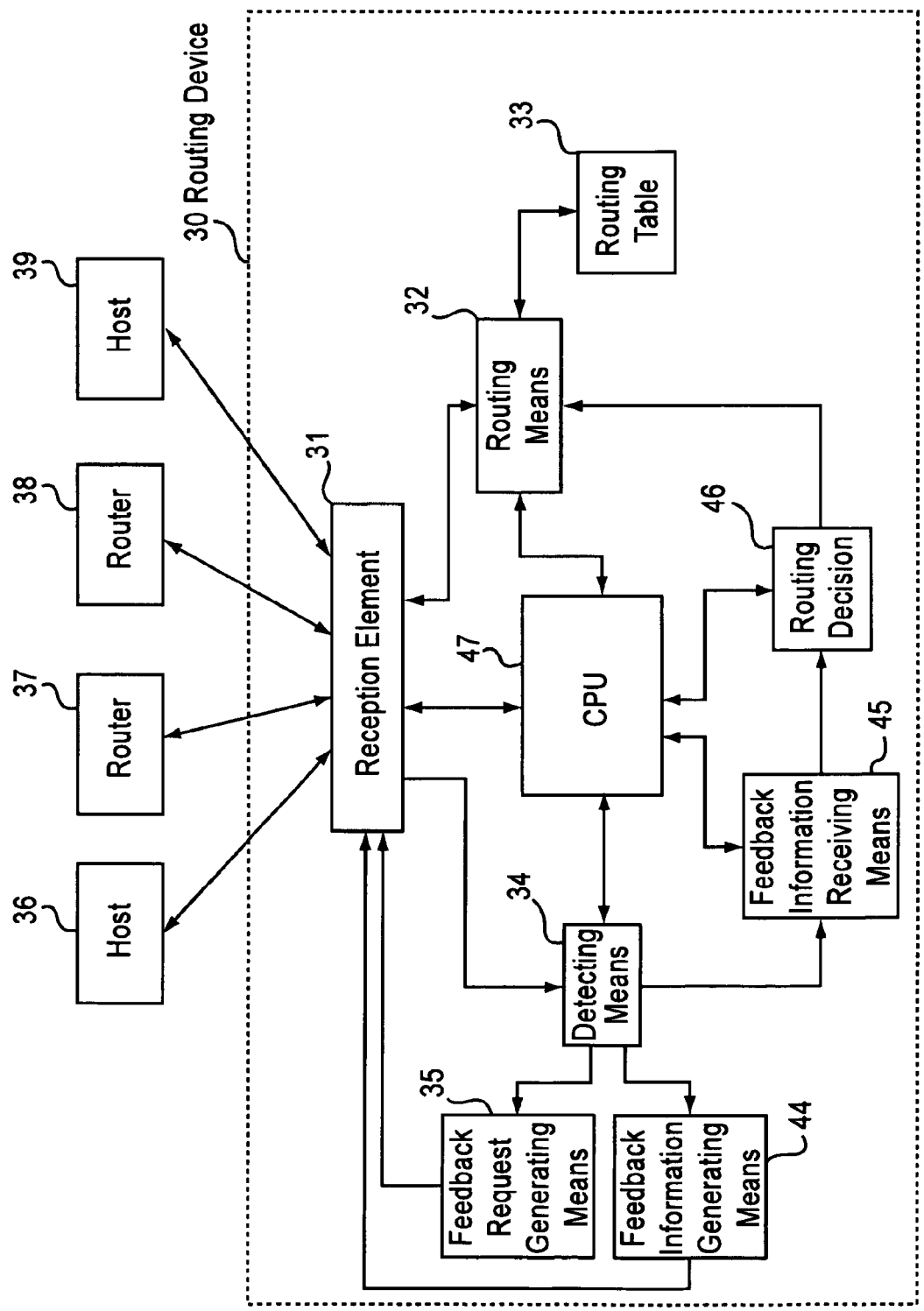
FIG. 3 illustrates a block diagram of a routing device according to the invention.

FIG. 3 shows a block diagram of a routing device 30 according to the invention. The device comprises a transmission and reception element 31 with inputs and outputs 40 to 43 connected thereto, which element receives data packets either directly from a sender 36 of packets or from another router 37 and transmits data packets routed by a routing means 32, on the basis of routing table 33 data, to next routers 38 or directly to a receiver 39 of packets. The routing device also comprises detecting means 34 for a data flow, a feedback request and feedback information, by which the received data packets are determined whether they belong to a particular data flow or whether they are feedback request or feedback information. Feedback request generating means 35 generate a message to other routers for returning the values of a particular parameter as feedback information. An identifier is added to the generated feedback request, so that other routers distinguish the feedback request from an ordinary data packet because they are transmitted in the same manner. In addition, the routing device comprises feedback information generating means 44, by which feedback information is generated in response to the received feedback request, and feedback information receiving means 45, by which feedback information transmitted by other routers is received, on the basis of which data a routing decision is made (reference 46). The made decision is always based on the transmitted feedback request and the received feedback information, on the basis of which decision the data packets belonging to the given data flow are routed onwards. For instance, a microprocessor 47 controls operational blocks in a centralized manner, whereby the operation of different operational blocks, such as routing of data packets in block 32, and identification of data flow in block 34, can be carried out in parallel.

Figure 4A:
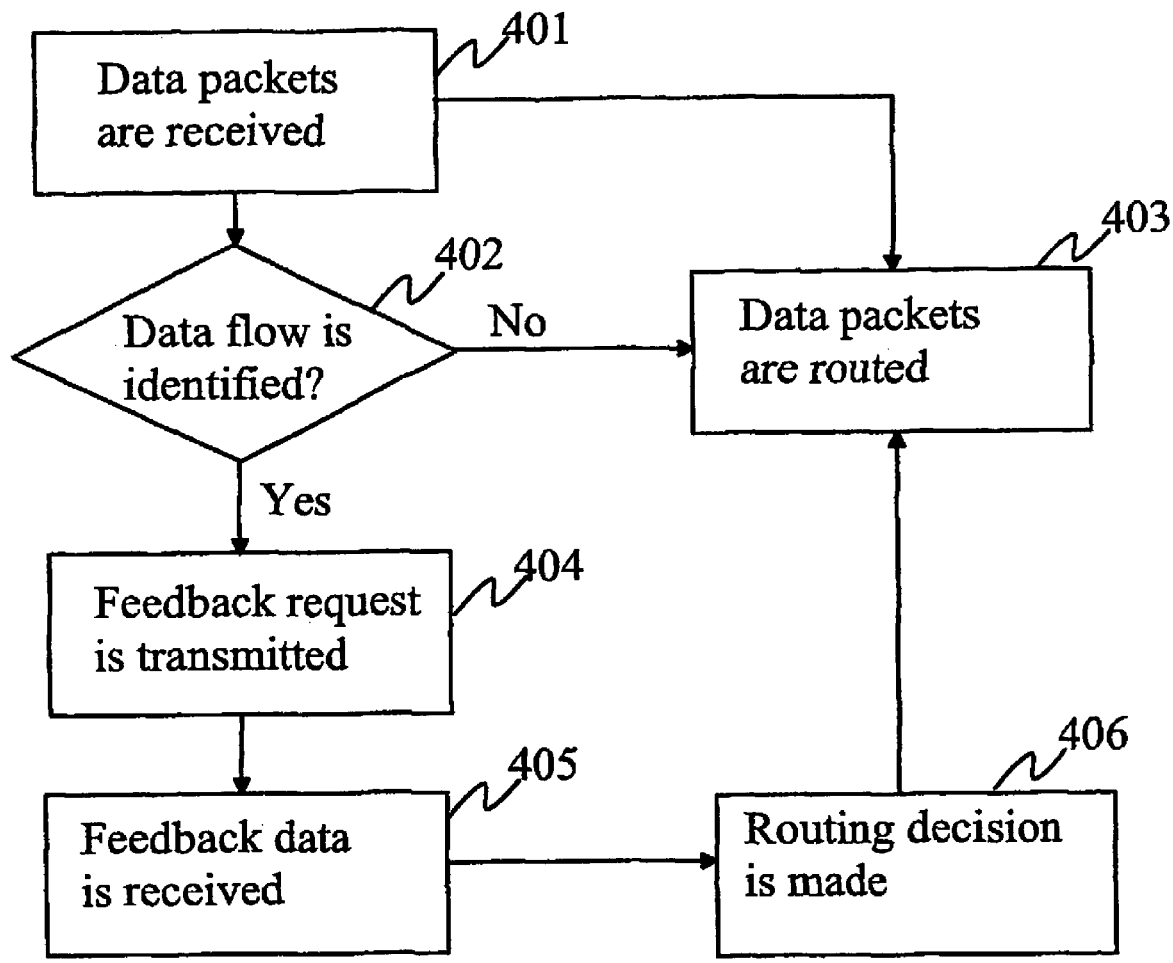
FIG. 4a illustrates a block diagram showing operation of a first router of the method of the invention.

FIG. 4a illustrates as a flow chart the operation of a first router based on the method of the invention. In the method, data packets are received from a source address (step 401) and the aim is to identify whether the received packets belong to a particular flow (step 402). The flow can be identified, for instance, in such a manner that within a given time period the router receives more than one data packets having the same source and destination addresses, also other methods applicable to flow identification can be used. If it is stated that the received packets do not belong to a particular flow, they are routed according to a general practice by using routing tables further to a next router or to the destination address depending on which one is in question (step 403). If the router detects that the received packets belong to a particular data flow, it transmits a feedback request (step 404) to at least one next router, which has either a direct connection to the destination address or a connection to routers having connection to the destination address. Next, the router receives the feedback information from all the routers to which it transmitted said feedback request (step 405). On the basis of the data, the router selects a next router for said data flow and makes a routing decision which represents the most optimal alternative at the reception moment of feedback parameters (step 406). From that time on, the router routes all the packets belonging to said flow via said route to the destination address. As a parallel process to steps 401 to 406, the received data packets are routed (steps 401, 403) either using routing tables or using previous routing data until new routing data is available, so the data packets do not stop at the router for the duration of said steps. Any router in the network can transmit the feedback request, for instance, at given time periods or at any time in case loading, speed or other factors of a previously selected route have changed such that said route is no longer optimal for the propagating flow.

Figure 4B:
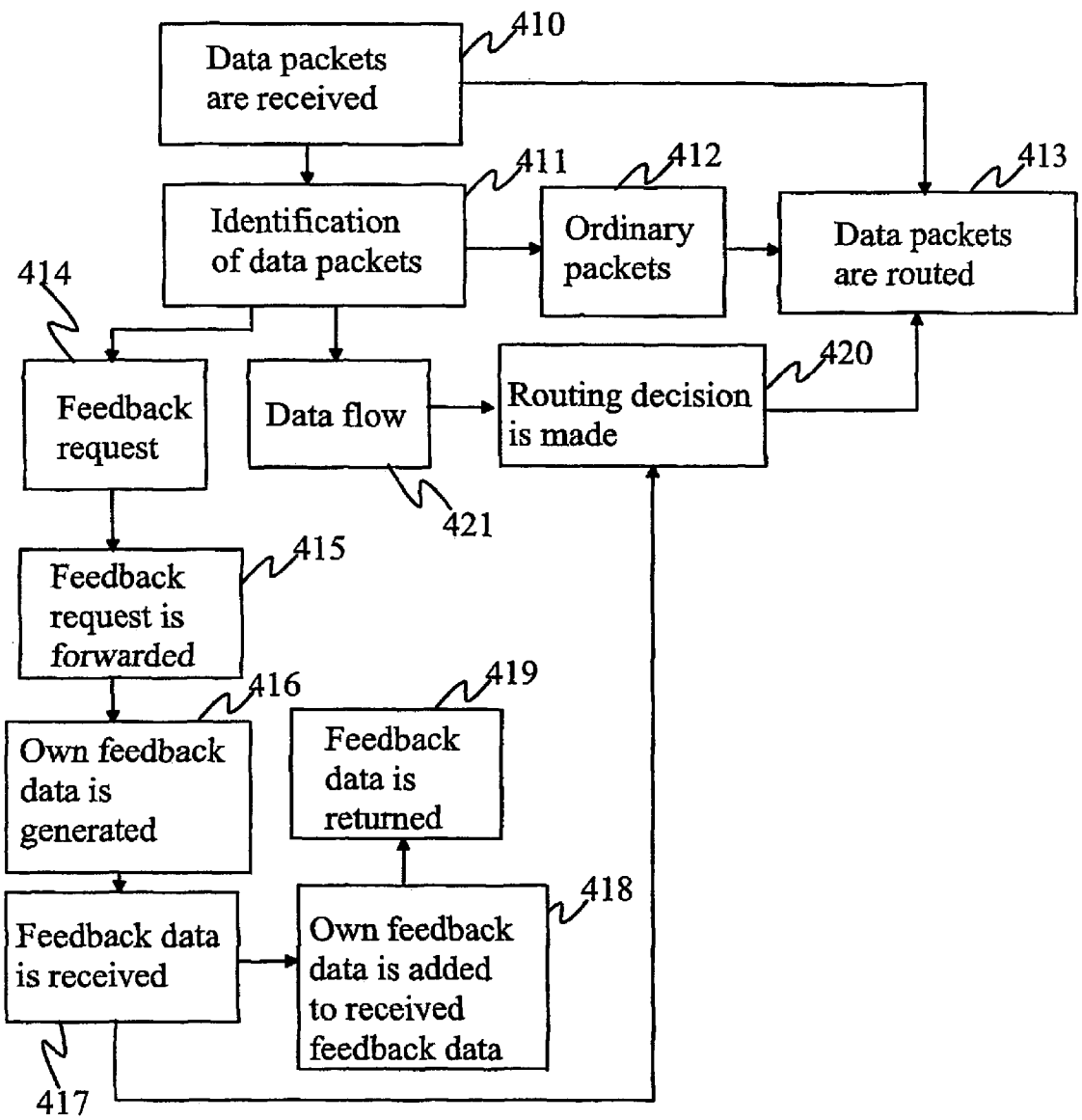
FIG. 4b illustrates a block diagram showing operation of a router between the first router and the last router of the method of the invention.

FIG. 4b illustrates as a flow chart the operation of a router between the first and the last routers according to the method of the invention. In the method, data packets are received (step 410) from at least one preceding router and the packets are identified (step 411). If the packets are identified as individual packets, not belonging to any particular flow (step 412) they are routed forwards, according to a general practice, using routing tables to a next router or to the destination address depending on which one is in question (step 413). Whereas, if the router receives a feedback request (step 414) it forwards the request to next routers (step 415). The router generates feedback information according to the feedback request (step 416) and upon receiving feedback information reverting from next routers it adds feedback of its own to said feedback information (step 418) and returns the updated feedback information to the router from which the feedback request arrived (step 419). On the basis of the received feedback information, the router forms the route for packets belonging to a particular data flow to the destination address (step 420). Upon receiving and identifying the packets which belong to the data flow (step 421) and to which said feedback request was directed, the router forwards the packets via the route that best fulfills the parameters of the feedback request. As a parallel process to steps 410 to 421 the received data packets are routed (steps 410, 413) either using routing tables or using previous routing data until new routing data is available, so the data packets do not stop at the router for the duration of said steps.

Figure 4C:
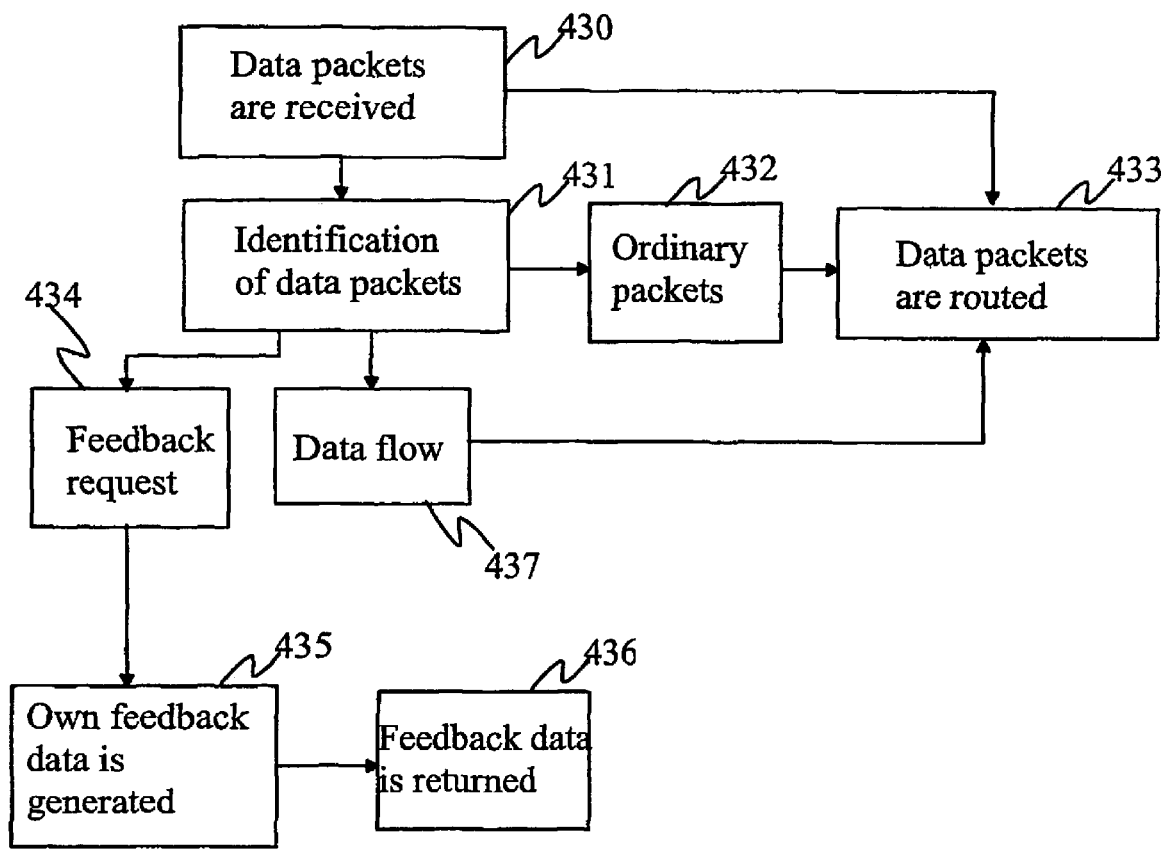
FIG. 4c illustrates a block diagram showing operation of the last router of the method of the invention.

FIG. 4c illustrates as a flow chart the operation of the last router according to the method of the invention. The router according to the method receives data packets (step 430) and identifies the packets (step 431) from at least one preceding router and routes the data packets to at least one destination address. If the data packets are identified as ordinary packets (step 432), they are routed, in an ordinary manner, using routing tables to the destination addresses (step 433). If a feedback request is received and identified (step 434), said router, being the last router on the route, generates feedback information according to the feedback request (step 435) by transmitting said feedback information back via the same route it arrived to said router (step 436). Upon receiving and identifying the packets which belong to the data flow and to which said feedback request was directed (step 437), the router forwards the packets to the destination address. As a parallel process to steps 430 to 437, all the received data packets are routed (steps 430, 433) either using routing tables or using previous routing data until new routing data is available, so the data packets do not stop at the router for the duration of said steps.

Physically, the router can be implemented as a router comprising e.g. a system according to FIG. 3, or as a computer whereby routing operation is performed by software. It is to be understood that, to act like a computer, the router needs a processor for performing commands and a memory for storing data according to the programmed functions. Correspondingly, to act as a router, the computer needs e.g. physical components so that it can be connected to the network.

Feedback request generation and transmission in response to a detected data flow is not limited only to the router that is the first one seen from the direction of the sender of data packets. Each router in the network is able to act as the first router, i.e. as the generator and transmitter of the feedback request. This is advantageous, for instance, when network loading increases locally more than expected. In general however, the first router that detects data flow on the received data packets and generates said feedback request is the router to which the data packet sender transmits the packets first.

In the above, the implementation and embodiments of the invention have been described by means of examples It is obvious to a person skilled in the art that the invention is not restricted to the details of the above-described embodiments but the invention can also be implemented otherwise without deviating from the characteristics of the invention. The described embodiments should be considered illustrative, not restrictive. The implementations and applications of the invention are only restricted by the attached claims. Thus, different implementation alternatives defined by the claims, and also equivalent implementations, are within the scope of the invention.

The invention claimed is:

1. A method, comprising:
  receiving, at a second router, a first router feedback request, the first router feedback request requesting connection quality data and originating from a first router between said second router and a source, where the first router feedback request comprises at least one quality of service parameter;
  generating, at said second router, a second router feedback request, the second router feedback request requesting connection quality data and comprising the first router feedback request and an address of the second router;
  transmitting, from said second router, said second router feedback request to at least one third router between said second router and a destination;
  in response to transmitting said second router feedback request, receiving, at said second router, third router feedback information from said at least one third router, the third router feedback information being different than said second router feedback request;
  in response to receiving said first router feedback request, generating, at said second router, second router feedback information based at least in part on the at least one quality of service parameter, the second router feedback information being different than said first router feedback request; and
  transmitting, from said second router, said second router feedback information and said third router feedback information to said at least one first router, the second router feedback information and said third router feedback information comprising connection quality data.

2. The method of claim 1, wherein the first router receives data packets transmitted from the source, detects header data of the received data packets, and makes a routing decision for said data packets based on the second router feedback information and the third router feedback information, and wherein detecting the header data comprises at least identifying a destination address of the data packets.

3. The method of claim 2, wherein the detecting the header data comprises detecting the data flow.

4. The method of claim 3, wherein the detecting the data flow comprises checking whether more than one data packet with a same destination address and a same media type is received within a predetermined time period.

5. The method of claim 3, further comprising: generating said first router feedback request in response to the detecting the data flow.

6. The method of claim 2, wherein the first router makes a routing decision for routing a set of data packets belonging to a particular data flow from the source to the destination.

7. The method of claim 1, wherein the second router feedback request is transmitted by all possible routes that lead to the destination.

8. The method of claim 1, further comprising: detecting said first router feedback request in a data packet received at the second router.

9. The method of claim 1, wherein said first router feedback comprises address data of the first router and address data of the destination.

10. The method of claim 9, wherein said first router feedback request comprises data for generating a connection quality parameter at said second router.

11. The method of claim 1, wherein the first router receives feedback information from all possible routes by which the first router feedback request was transmitted.

12. The method of claim 1, comprising adding the third router feedback information to the second router feedback information at said second router.

13. The method of claim 1, wherein the transmitting said second router feedback information and said third router feedback information comprises transmitting by a route that is a same route as the first router feedback request arrived.

14. The method of claim 13, further comprising: configuring said second router feedback information and said third router feedback information to comprise addresses of those routers that are located on the route.

15. The method of claim 13, wherein said second router feedback information and said third router feedback information further comprise at least one connection quality parameter.

16. The method of claim 1, where receiving the third router feedback information comprises receiving a first message comprising the third router feedback information and the second router feedback request, and
  where transmitting the second router feedback information and the third router feedback information comprises transmitting a second message comprising the first router feedback request, the second router feedback information and the third router feedback information.

17. A system, comprising:
  a first router; and
  at least one second router,
  wherein the first router is configured to receive data packets from a source and transmit them to a destination via the at least one second routers,
  wherein the first router comprises
  detecting means for detecting header data of the data packets,
  feedback request generating means for generating a first router feedback request, the first router feedback request requesting connection quality data in response to a detection of a data flow in the first router, where the first router feedback request comprises at least one quality of service parameter, and
  feedback request transmitting means for transmitting the first router feedback request to at least one second router in a destination direction of the destination to ascertain a quality of connection between said first router and said at least one second router,
  wherein each of said at least one second router comprises at least
  feedback request receiving means for receiving the first router feedback request from said first router,
  second request generating means for a second router feedback request,
  second request transmitting means for transmitting the second router feedback request to at least a third router in a destination direction of the destination, and
  feedback information generating means for generating second router feedback information in response to receiving the first router feedback request based at least in part on the at least one quality of service parameter, the second router feedback information being different than said first router feedback request,
  wherein said third router comprises at least
  feedback request receiving means for receiving the second router feedback request from said second router,
  feedback information generating means for generating third router feedback information in response to receiving the second router feedback request, the third router feedback information being different than said second router feedback request, and feedback information transmitting means for transmitting said third router feedback information to said at least one second router, and wherein each of said at least one second router further comprises feedback information transmitting means for transmitting said second router feedback information and said third router feedback information to said first router, and wherein said first router further comprises feedback information receiving means for receiving the second router feedback information and third router feedback information from the at least one second router, and decision making means for making a routing decision based on the received feedback information.

18. The system of claim 17, wherein said detecting means comprises destination address detecting means for detecting a destination address in a header data of the data packet.

19. The system of claim 18, wherein said detecting means is further for detecting the data flow of the received data packets when more than one data packet with a same destination address and a same media type is received within a predetermined time period.

20. The system of claim 17, wherein said first router feedback request comprises a request for a predetermined parameter value.

21. The system of claim 17, wherein said first router feedback request generating means is configured to transmit said first router feedback request as a data packet.

22. The system of claim 17, wherein said second router feedback request receiving means is further for identifying the first router feedback request in the data packets.

23. The system of claim 17, wherein said second router feedback information generating means is further for generating a value of at least one desired connection quality parameter received in the first router feedback request.

24. The system of claim 17, wherein said second router feedback information transmitting means is further for transmitting the second router feedback information back by a same route as the first router feedback request was received.

25. The system of claim 17, wherein said first router feedback information receiving means for receiving the second router feedback information and third router feedback information is further for detecting the second router feedback information and third router feedback information in the data packets.

26. The system of claim 17, wherein each of said at least one second router further comprises adding means for adding said third router feedback information to said second router feedback information.

27. The system of claim 17, wherein said decision making means is further for forming a route for a set of data packets belonging to a particular data flow.

28. An apparatus, comprising:
feedback request receiving means for receiving, at a routing device, a first feedback request, the first router feedback request requesting connection quality data and originating from at least one preceding routing device between said routing device and a source, where the first router feedback request comprises at least one quality of service parameter;
feedback request generating means for generating a second feedback request, the second router feedback request requesting connection quality data, the second router feedback request comprising an address of the second router;
feedback request transmitting means for transmitting the second feedback request to at least one next routing device between said routing device and a destination;
feedback information generating means for generating a first feedback information in response to receiving the first feedback request based at least in part on the at least one quality of service parameter, the first feedback information being different than said second router feedback request;
feedback information receiving means for receiving a second feedback information from said at least one next routing device in response to transmitting said second feedback request, the second feedback information being different than said second feedback request; and
feedback information transmitting means for transmitting the first feedback information and the second feedback information to said at least one preceding routing device.

29. The apparatus of claim 28, further comprising:
feedback information adding means for adding the first feedback information to the second feedback information thereby providing combined feedback information.

30. The apparatus of claim 29, wherein said feedback information adding means is configured to add required parameters and address data to said combined feedback information.

31. A computer-readable medium tangibly encoded with a computer program executable by a processor to perform actions comprising:
receiving at a router a first feedback request, the first feedback request requesting connection quality data and originating from at least one preceding router between said router and a source, where the first router feedback request comprises at least one quality of service parameter;
generating a second feedback request requesting connection quality data, the second router feedback request comprising an address of the second router;
transmitting said second feedback request to at least one next router between said router and a destination,
generating a first feedback information in response to receiving said first feedback request from said at least one preceding router based at least in part on the at least one quality of service parameter, the first feedback information being different than said second router feedback request,
receiving a second feedback information from said at least one next router in response to transmitting said second feedback request, the second feedback information being different than said second feedback request, and
transmitting the first feedback information and the second feedback information to the at least one preceding router.

32. The computer-readable medium according to claim 31, the actions further comprising adding the second feedback information to the first feedback information thereby providing combined feedback information.

33. An apparatus, comprising at least one processor; and at least one memory including computer program code, the at least one memory and the computer program code configured to, with the at least one processor, cause the apparatus to perform at least the following:
to receive at a routing device a first feedback request, the first feedback request requesting connection quality data and originating from at least one preceding routing device between said routing device and a source, where the first router feedback request comprises at least one quality of service parameter;

to generate a second feedback request, the second feedback request requesting connection quality data, the second router feedback request comprising an address of the second router;

to transmit the second feedback request to at least one next routing device between said routing device and a destination;

to generate a first feedback information in response to receiving the first feedback request based at least in part on the at least one quality of service parameter, the first feedback information being different than said second router feedback request;

to receive a second feedback information from said at least one next router in response to transmitting said second feedback request, the second feedback information being different than said second feedback request; and to transmit the first feedback information and the second feedback information to said at least one preceding routing device.

34. The apparatus of claim 33, where the at least one memory and the computer program code are further configured to cause the apparatus:

to add the first feedback information to the second feedback information thereby providing combined feedback information.

35. The apparatus of claim 34, wherein the feedback information adder is configured to add required parameters and address data to said combined feedback information.

* * * * *